2,852,173
FLOATING FISH STRINGER

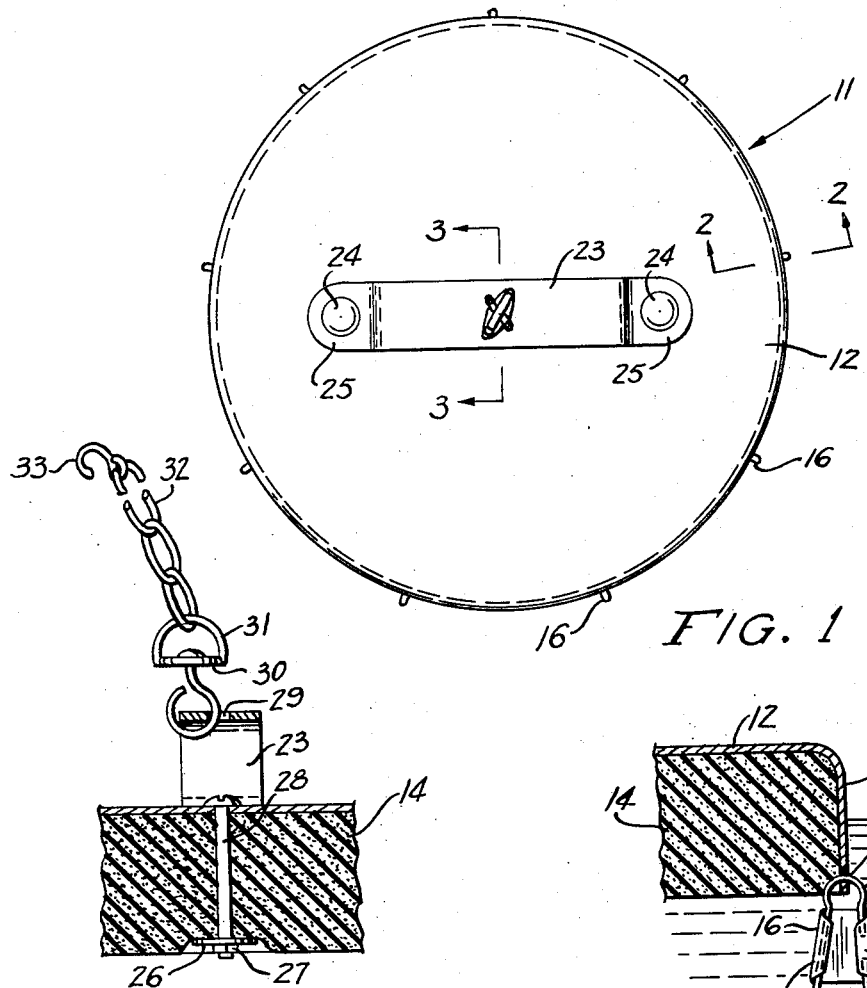

Thomas G. Milner, Sr., Clarendon, Ark.

Application June 26, 1956, Serial No. 593,980

2 Claims. (Cl. 224—7)

This invention relates to fisherman's equipment, more particularly to a floating fish stringer for use in holding a plurality of fish just below the surface of the water adjacent a boat or the like.

The main object of the invention is to provide a novel and improved floating support for holding a plurality of fish adjacent the surface of the water near a boat or the like, said support being simple in construction, being light in weight, and being easy to manipulate.

A further object of the invention is to provide an improved floating fish stringer which is inexpensive to fabricate, which is durable in construction, and which may be readily moored to a boat or other objects so that a string of fish supported on the device will be securely anchored.

Further objects and advantages of the invention will become apparent from the following description and claims, and from the accompanying drawings, wherein:

Figure 1 is a top plan view of an improved fish stringer constructed in accordance with the present invention.

Figure 2 is an enlarged cross-sectional detail view taken on the line 2—2 of Figure 1.

Figure 3 is an enlarged cross-sectional detail view taken on the line 3—3 of Figure 1.

Referring to the drawings, the improved fish stringer is generally designated at 11 and comprises a generally circular main body 12 of relatively thin light sheet metal, such as aluminum or the like, the circular body 12 being formed with a depending peripheral flange 13, thus defining a receptacle in the nature of a circular pan.

The receptacle thus defined by the body 12 and its integral peripheral flange 13 has rigidly secured therein a mass of relatively light buoyant rigid sponge material, shown at 14, said material filling the receptacle. The material 14 may be of any suitable rigid sponge material, such as the solidified plastic sponge material known as "Ster-foam" now in wide use for display and similar purposes, since the material is white in color and has a texture representing snow.

As shown in Figure 2, the mass 14 has its bottom surface substantially flush with the bottom edge of the flange 13.

Flange 13 is formed around its periphery with evenly spaced apertures 15 located adjacent the bottom edge of the flange, and dependingly connected to each aperture 15 is a fish stringer hook 16, the hook 16 comprising the sheet metal, downwardly divergent flat bracket portion 18 formed at one margin with the closed tubular element 17 in which is secured one arm 19 of a body of resilient wire. The body of wire is formed with the top hook 20 and with the substantially larger bottom hook 21, the ends of the respective hooks 20 and 21 being engageable in a locking channel element 22 formed in the margin of the bracket portion 18 opposite the tubular element 17. As will be readily apparent from Figure 2, the ends of the hooks 20 and 21 may be manually disengaged from the holding channel 22, since said hooks are of a resilient nature, whereby the hook assembly 16 may be either disengaged from its associated aperture 15, or the larger hook element 21 may be released from the element 22 to string a fish thereon or to remove a fish therefrom, as required.

Designated at 23 is an arch bracket member having respective end lugs 25, 25 which are secured to the body 12 by suitable fastening means, such as rivets 24, 24, with the main portion of the bracket 23 overlying the center of body 12. The bracket member 23 is formed at its mid point with an aperture 29, and engaged through the aperture 29 is a swivel hook 30, as shown in Figure 3, the hook 30 being provided with the top eye 31 which may be connected to a fastening chain 32 provided with a hook 33 at its free end, or other flexible fastening means for securing the device to a boat or similar object.

The mass of rigid sponge material 14 may be easily fastened inside the housing defined by the body 12 and flange 13 in any suitable manner, for example, as by a central bolt 28 extending through the body 12 and through the mass 14 and provided at its bottom portion with a washer 26 bearing on the bottom surface of the mass of material 14 and retained thereagainst by a nut 27 engaged on the lower end of the bolt 28.

In using the device, the fish are engaged on the respective hooks 16 as they are caught and are supported on the buoyant main portion of the device, the device being fastened by means of a suitable chain or other flexible connector to the boat or to any other convenient object to prevent the device from floating away. When the device is removed from the water, it may be detached from the chain 32 and may be carried by employing the arch bracket 23 as a carrying handle.

By the use of the device of the present invention, a string of fish attached to the device will not become lost if the device becomes detached from a boat because the device will remain afloat and may be easily retrieved.

The device is arranged to support the fish at a suitable distance below the surface of the water, for example, about 8 inches, so that the fish will not become entangled with underwater snags, brush, or any portion of an outboard motor adjacent thereto.

When carrying the device, loaded with fish, by means of the handle member 23, the fish will be supported at a sufficient height to prevent the fish from being dragged on the ground.

While the specific embodiment of an improved fish stringer has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a fish stringer, a relatively thin sheet metal body having a depending peripheral flange formed with apertures spaced around the periphery of said body, a fish stringer hook dependingly connected to each of said apertures, and a mass of relatively light buoyant rigid sponge material secured in the housing defined by said body and peripheral flange, each of said hooks comprising a downwardly divergent flat bracket portion, a closed tubular element extending along one margin of said bracket portion, a locking channel element on a margin of said bracket portion opposite said one margin, and a body of wire formed with a top hook and a bottom hook with an arm connecting the hooks together having said arm extending through and secured to said closed tubular element with the top hook dependingly connected to a flange aperture, the end of the bottom hook being detachably engageable in said locking element.

2. In a fish stringer, a relatively thin sheet metal body having a depending peripheral flange formed with apertures spaced around the periphery of said body, a fish stringer hook dependingly connected to each of said apertures, a mass of relatively light buoyant rigid sponge material secured in the housing defined by said body and peripheral flange, each of said hooks comprising a downwardly divergent flat bracket portion, a closed tubular element extending along one margin of said bracket portion, a locking channel element on a margin of said bracket portion opposite said one margin, and a body of wire formed with a top hook and a bottom hook with an arm connecting the hooks together having said arm extending through and secured to said closed tubular element with the top hook dependingly connected to a flange aperture, the end of the bottom hook being detachably engageable in said locking element, a fastening bracket secured to the intermediate portion of said body, and a swivel hook connected to said fastening bracket.

References Cited in the file of this patent

UNITED STATES PATENTS

| | | |
|---|---|---|
| 2,426,298 | Davy | Aug. 26, 1947 |
| 2,537,663 | Geiger | Jan. 9, 1951 |
| 2,698,117 | Graves | Dec. 28, 1954 |
| 2,708,538 | Matras | May 17, 1955 |
| 2,800,263 | Hunt | July 23, 1957 |